United States Patent
Guivarc'h et al.

(10) Patent No.: US 10,436,036 B2
(45) Date of Patent: Oct. 8, 2019

(54) FITTED PLATFORM FOR A TURBINE ENGINE FAN, AND A METHOD OF FABRICATING IT

(71) Applicant: Safran Aircraft Engines, Paris (FR)

(72) Inventors: Jeremy Guivarc'h, Portsmouth, NH (US); Francois Charleux, Portsmouth, NH (US)

(73) Assignee: Safran Aircraft Engines, Paris (FR)

( * ) Notice: Subject to any disclaimer, the term of this patent is extended or adjusted under 35 U.S.C. 154(b) by 461 days.

(21) Appl. No.: 15/201,979

(22) Filed: Jul. 5, 2016

(65) Prior Publication Data
US 2018/0010462 A1 Jan. 11, 2018

(51) Int. Cl.
*F01D 5/14* (2006.01)
*F01D 5/28* (2006.01)
(Continued)

(52) U.S. Cl.
CPC .............. *F01D 5/143* (2013.01); *B29B 11/16* (2013.01); *B29C 45/02* (2013.01); *B29C 45/14631* (2013.01); *D03D 1/00* (2013.01); *D03D 13/004* (2013.01); *D03D 25/005* (2013.01); *F01D 5/282* (2013.01); *F01D 11/008* (2013.01); *B29K 2713/00* (2013.01); *B29L 2031/082* (2013.01); *D10B 2505/02* (2013.01); *F05D 2220/36* (2013.01); *F05D 2240/80* (2013.01);
(Continued)

(58) Field of Classification Search
CPC ........ F01D 5/143; F01D 5/282; F01D 11/008; F05D 2220/36; F05D 2240/80; F05D 2300/6012; F05B 2240/80
See application file for complete search history.

(56) References Cited

U.S. PATENT DOCUMENTS 6,217,283 B1* 4/2001 Ravenhall ............... F01D 5/225
415/9
9,556,742 B2* 1/2017 Parkin ..................... F01D 5/147
(Continued)

FOREIGN PATENT DOCUMENTS

EP    2 458 153 A2    5/2012
EP    2 540 479 A1    1/2013
(Continued)

OTHER PUBLICATIONS

International Search Report dated Oct. 16, 2017 in PCT/FR2017/051700 (with English translation of categories of cited documents).

*Primary Examiner* — Woody A Lee, Jr.
*Assistant Examiner* — Christopher R Legendre
(74) *Attorney, Agent, or Firm* — Oblon, McClelland, Maier & Neustadt, L.L.P.

(57) ABSTRACT

A fitted platform for positioning between two adjacent blades of an aviation turbine engine fan includes a flow passage wall made of composite material having a central portion, and first and second margins each extending in a longitudinal direction of the wall. Each margin extends over a determined distance from the central portion in a transverse direction of the wall. The flow passage wall includes a fiber reinforcement densified by a matrix. The fiber reinforcement present in the central portion presents three-dimensional weaving, and the fiber reinforcement present in the first and second margins presents two-dimensional weaving, at least in part.

9 Claims, 3 Drawing Sheets

(51) Int. Cl.

| | | |
|---|---|---|
| *F01D 11/00* | (2006.01) | |
| *B29B 11/16* | (2006.01) | |
| *B29C 45/02* | (2006.01) | |
| *B29C 45/14* | (2006.01) | |
| *D03D 1/00* | (2006.01) | |
| *D03D 13/00* | (2006.01) | |
| *D03D 25/00* | (2006.01) | |
| *B29L 31/08* | (2006.01) | |

(52) U.S. Cl.
CPC ............... *F05D 2300/6012* (2013.01); *F05D 2300/6034* (2013.01)

(56) References Cited

U.S. PATENT DOCUMENTS

| | | | |
|---|---|---|---|
| 10,041,196 B2 * | 8/2018 | Gimat | ............. B29C 70/222 |
| 2004/0175553 A1 | 9/2004 | Bouillon et al. | |
| 2009/0280707 A1 | 11/2009 | Bouillon et al. | |
| 2012/0055609 A1 | 3/2012 | Blanchard et al. | |
| 2012/0134839 A1 | 5/2012 | Parkin et al. | |
| 2012/0258641 A1 | 10/2012 | Bouillon et al. | |
| 2013/0004715 A1 | 1/2013 | Jarmon et al. | |
| 2014/0349538 A1 * | 11/2014 | Marchal | ............. B29C 70/24 442/206 |
| 2015/0167209 A1 | 6/2015 | Marchal et al. | |
| 2016/0160663 A1 | 6/2016 | Mortier et al. | |
| 2016/0244897 A1 | 8/2016 | Gimat et al. | |
| 2017/0058912 A1 * | 3/2017 | De Gaillard | ............ B29B 11/16 |
| 2018/0010462 A1 * | 1/2018 | Guivarc'H | ............. B29B 11/16 |

FOREIGN PATENT DOCUMENTS

| | | |
|---|---|---|
| FR | 3 011 253 A1 | 4/2015 |
| JP | 6-137103 A | 5/1994 |

* cited by examiner

FITTED PLATFORM FOR A TURBINE ENGINE FAN, AND A METHOD OF FABRICATING IT

BACKGROUND OF THE INVENTION

The present invention relates to the general field of aviation turbine engines, and more particularly it relates to a fitted platform for a turbine engine fan.

The fan of an aviation turbine engine generally comprises a plurality of movable blades with platforms being present between them at their roots. The main function of the platform is to define the flow passage for the gas stream entering into the turbine engine. Because of their aerodynamic function, the flow passage walls of platforms need to be in intimate contact with the adjacent blades in order to provide sealing between the platforms and the blades. In the event of ingesting objects (blocks of ice, birds, etc.), fan blades may be impacted and become deformed. The deformation is then transmitted to the flow passage walls of the platforms which must, wherever possible, avoid becoming damaged or broken, even in the event of a major impact.

In order to avoid damaging blades and platforms, the blades and the top walls of platforms need to make contact appropriately. For this purpose, it is known to thin down the margins of a platform top wall where they are to come into contact with blades, i.e. to reduce wall thickness locally in the contact zones between a blade and a platform. These thin margins enable contact between the platforms and the blades to be made more flexibly, and they can be effective in damping impacts and thus reduce the damage that results therefrom on the blades and the platforms.

When the platforms are made of composite material made of fiber reinforcement densified by a matrix, thinning down the margins of the flow passage wall generally requires a machining step. In particular, with thin margins, it is often necessary to put gaskets into place in order to provide sealing between the blades and the platform. The machining step is difficult to perform and it lengthens methods of fabricating and installing platforms, thereby increasing costs.

There therefore exists a need for a fitted platform for a fan blade that is easy and inexpensive to fabricate and that does not present the above-mentioned drawbacks.

OBJECT AND SUMMARY OF THE INVENTION

A main object of the present invention is thus to mitigate such drawbacks by proposing a fitted platform for positioning between two adjacent blades of an aviation turbine engine fan, said platform comprising a flow passage wall made of composite material having a central portion and first and second margins each extending in a longitudinal direction of said wall, each margin extending over a determined distance from the central portion in a transverse direction of said wall, said flow passage wall comprising fiber reinforcement densified by a matrix, the platform being characterized in that the fiber reinforcement present in the central portion presents three-dimensional weaving, and in that the fiber reinforcement present in the first and second margins presents two-dimensional weaving, at least in part.

The term "two-dimensional weaving" or "2D weaving" is used herein to mean a conventional method of weaving in which each warp yarn passes from one side to the other of yarns in a single weft layer. The term "three-dimensional weaving" or "3D weaving" is used herein to mean a method of weaving in which at least some of the warp yarns interlink weft yarns over a plurality of weft layers.

The margins of the flow passage wall of the platform of the invention provide contact between the platform and the adjacent blades that is flexible, without requiring additional machining, and as a result it may be possible to avoid adding a gasket. For given thickness, a composite material presenting fiber reinforcement obtained by three-dimensional weaving requires more energy to become delaminated than does a composite material presenting fiber reinforcement obtained by two-dimensional weaving. It is thus possible to increase the flexibility of the composite material in the margins by weaving the fiber reinforcement with different weaves in the margins (which have 2D weaving, at least in part) and the central portion of the flow passage wall (3D weaving). There is then no longer any need to machine the margins in order to obtain a platform that can accommodate collisions against the adjacent blades in the event of an impact with an object.

The weave in the first and second margins may be selected from: plain, satin, serge.

Each margin may extend in the transverse direction of the flow passage wall from the central portion over a determined distance D such that a ratio D/L lies in the range 2% to 10%, e.g. in the range 5% to 10%, where L is the width of the flow passage wall in the transverse direction of said wall.

Each margin may present a thickness e such that a ratio e/D lies in the range 5% to 50%, e.g. in the range 5% to 10%, where D is the determined distance over which each margin extends in the transverse direction of the flow passage wall from the central portion.

In an embodiment, the platform may have a bottom wall for resting on a fan disk and two side walls extending between the bottom wall and the flow passage wall of said platform. In this configuration, the platform can be said to be a "box" platform.

In an embodiment, the platform may be made of composite material and comprises fiber reinforcement densified by a matrix, the fiber reinforcement of the flow passage wall constituting a portion of the fiber reinforcement of the platform.

The invention also provides an aeroengine turbine engine fan module comprising at least two blades and at least one platform as described above, positioned between two adjacent blades, and it also provides a turbine engine including such a fan module. The term "fan module" is used in conventional manner to designate a module of the turbine engine that comprises in particular the fan and, where applicable, the low pressure compressor.

Finally, the invention also provides a method of fabricating a fitted platform as described above, the method comprising the following steps:

weaving a fiber preform to form the fiber reinforcement of the flow passage wall of the platform; and forming a matrix in the pores of said fiber preform.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF THE INVENTION

Figure 1:
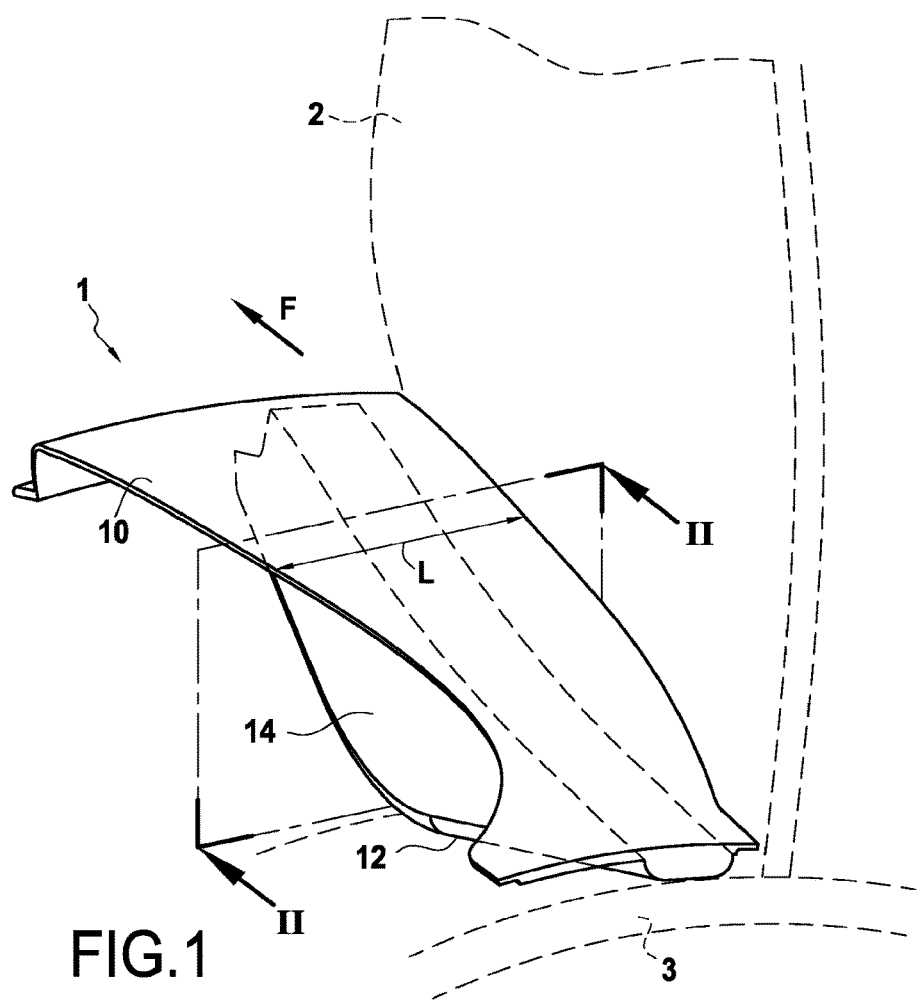
FIG. 1 shows a box-type fitted platform for a turbine engine fan.

FIG. 1 shows an example of a fitted platform 1 for an aviation turbine engine fan. The platform 1 is positioned between two adjacent blades 2 (only one blade 2 is shown diagrammatically in dashed lines in FIG. 1) and it is mounted on a fan disk 3. The platform 1 shown in FIG. 1 is a platform made entirely out of composite material and it is of the box type, i.e. it presents a flow passage wall 10, a bottom wall 12, and two side walls 14 extending between the bottom wall 12 and the flow passage wall 10. The bottom wall 12 of the platform comes into contact with the fan disk 3 when the engine is stationary. The direction of the air stream entering into the turbine engine is indicated in the figure by arrow F. When the engine is in operation, the flow passage wall 10 of the platform defines the inside (relative to the longitudinal axis of the turbine engine, not shown) of the flow passage for the gas stream entering into the turbine engine.

The platform 1 may be constituted in full or in part by fiber reinforcement densified by a matrix. The fiber reinforcement may comprise carbon fibers or ceramic fibers. The matrix may be a ceramic matrix, or more often an organic matrix, and it may be obtained from a densification resin, for example.

Figure 2:
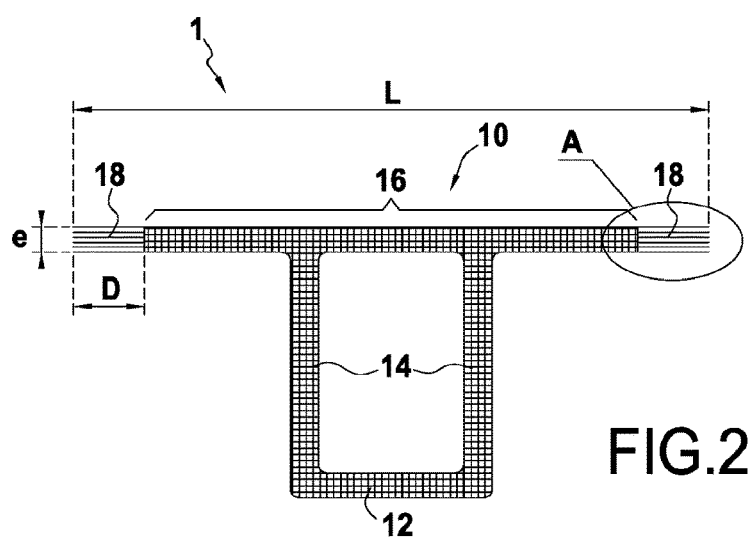
FIG. 2 is a diagrammatic cross-section view of the fitted platform of FIG. 1.

FIG. 2 is a diagrammatic section view of the FIG. 1 platform 1. The flow passage wall 10 of the platform 1 has a central portion 16 and two margins 18. The margins 18 extend in the longitudinal direction of the flow passage wall 10, in this example over the entire length of the flow passage wall 10. The longitudinal direction of the flow passage wall 10 extends in the direction given by its long dimension, the transverse direction being perpendicular to the longitudinal direction. The flow passage wall 10 in this example extends transversely between its two margins 18.

In accordance with the invention, the flow passage wall 10 comprises fiber reinforcement densified by a matrix. In a portion corresponding to the central portion 16, the fiber reinforcement presents three-dimensional weaving. The portions of the fiber reinforcement corresponding to the margins 18 of the flow passage wall 10 present two-dimensional weaving, at least in part. By way of example, in the central portion 16, the fiber reinforcement may present an interlock or multilayer type weave, and in the margins it may present a satin, plain, or serge type weave. It should be observed that it is also possible to provide for mixed weaving in the fiber reinforcement for the margins 18, i.e. weaving that is two-dimensional over a fraction of the thickness of the margin 18 and three-dimensional over the remaining fraction of the thickness of the margin 18.

Each of the margins 18 may extend in the transverse direction of the flow passage wall 10 from the central portion 16 over a determined distance D. The distance D at a point of the flow passage wall 10 may be such that D/L lies in the range 2% to 10%, e.g. in the range 5% to 10%, where L is the width of the flow passage wall at the point under consideration. Naturally, and as for the platform 1 in FIG. 1, the width L may vary along the flow passage wall 10 so that the distance D may likewise vary along the flow passage wall 10. The thickness e of a margin 18 may be different from the thickness of the remainder of the flow passage wall 10. Under such circumstances, the thickness e of a margin 18 may be such that e/D lies in the range 5% to 50%, and for example in the range 5% to 10%.

Two examples of weaves in the zone A of the margins 18 as identified in FIG. 2 are described below respectively with reference to FIGS. 3A & 3B and with reference to FIGS. 4A & 4B. In these figures, the weft yarns are visible in section and are shown as being in a staggered configuration, such that a weft yarn layer T comprises two consecutive half-layers of weft yarns $t_1$ & $t_2$, $t_3$ & $t_4$, etc. The warp yarns are referenced $c_1$ to $c_{10}$. Throughout the specification and in all of the drawings, by convention and for reasons of convenience, it is stated and shown that it is the warp yarns that depart from their path in order to take hold of weft yarns in one or more layers of weft yarns. Nevertheless, these roles may be interchanged between warp and weft.

Figure 3A:
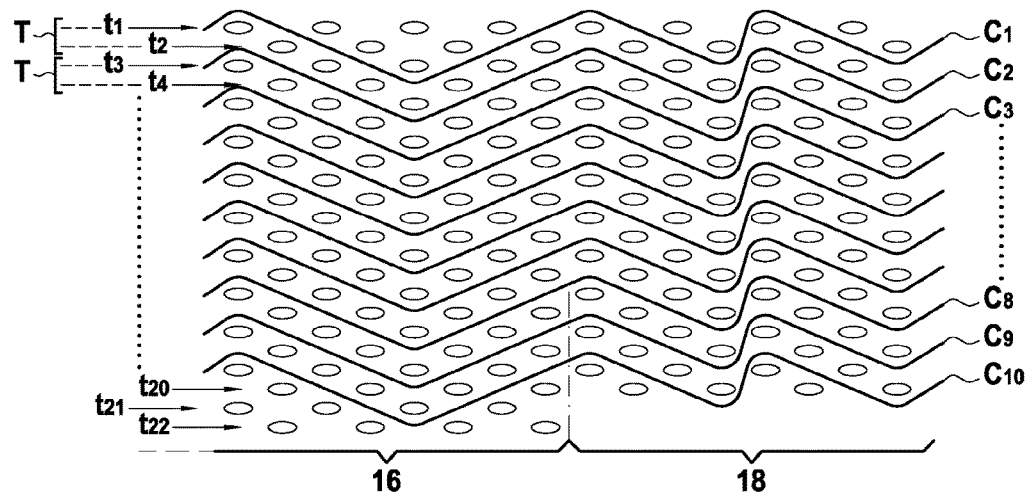
FIGS. 3A & 3B and 4A & 4B show respectively two example weaves at a margin of the flow passage wall.
Figure 3B:
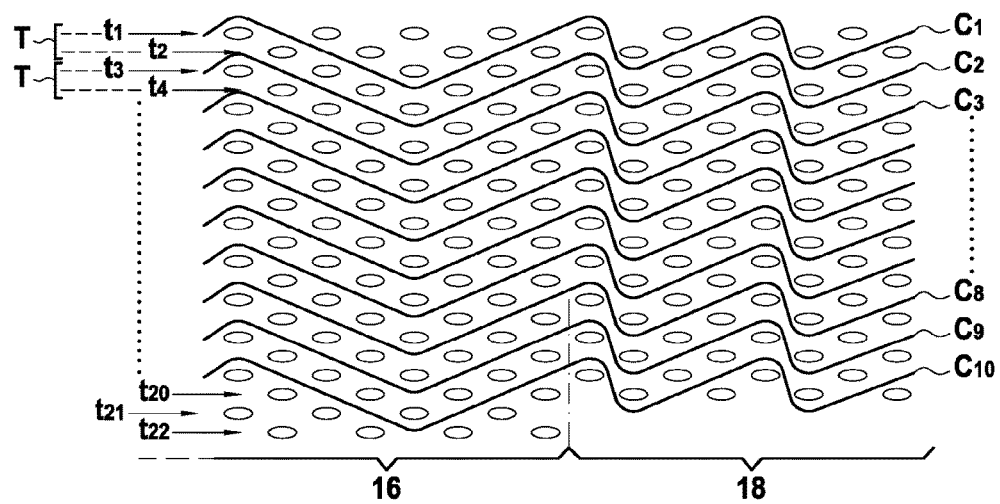

FIGS. 3A and 3B show respectively two weave planes of the weaving of the fiber reinforcement in the zone A in the proximity of a margin 18, in a first example. In this example, the fiber reinforcement of the entire central portion 16 presents a three-dimensional weave of interlock type, and the fiber reinforcement of the margins 18 presents a two-dimensional weave of the serge type. Eleven weft yarn layers T of the fiber reinforcement of the central portion 16 are shown, i.e. twenty-two half-layers of weft yarns $t_1$ to $t_{22}$. The fiber reinforcement at the margin 18 has ten weft yarn layers T, i.e. twenty half-layers of weft yarns $t_1$ to $t_{20}$.

In the example shown, the fiber reinforcement in the central portion 16 presents an interlock weave in which each warp yarn $c_1$ to $c_{10}$ interlinks three weft yarn half-layers. Furthermore, in the margin 18, the fiber reinforcement presents a conventional serge weave in which each warp yarn $c_1$ to $c_{10}$ takes hold of two weft yarns going from one side to the other of a single weft yarn layer T. At the margins 18, the weft yarn layers T are not interlinked by warp yarns $c_1$ to $c_{10}$. Thus, in the margins 18, a stack of two-dimensional fabric strips is obtained, each of which strips is connected to the central portion 16 by weaving. In the event of an impact leading to relative movements of the margins 18 of the platform 1 against the neighboring blades 2, delamination can occur between the fabric plies or strips that present two-dimensional weaving, i.e. the strip of fabric may separate from one another.

Figure 4A:
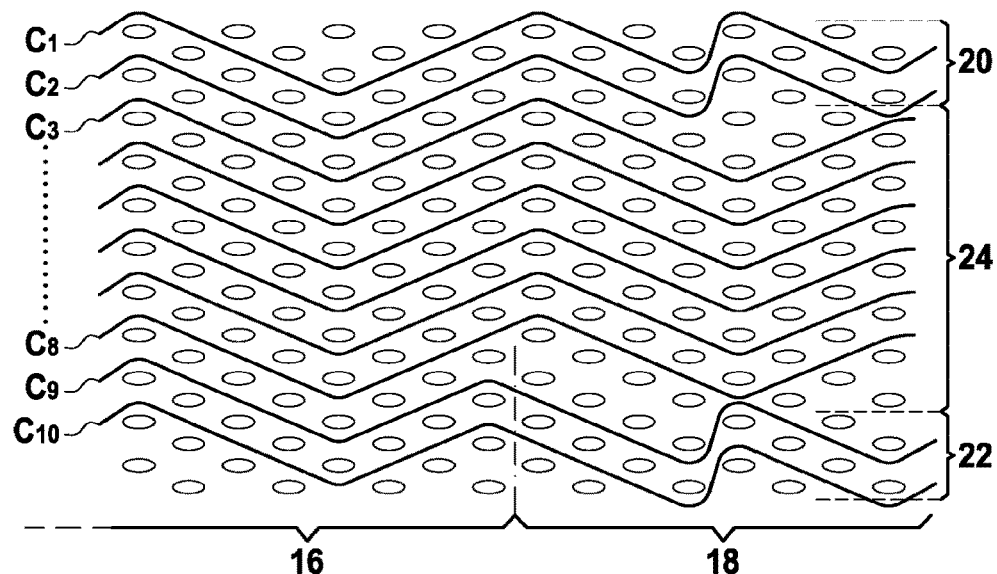
Figure 4B:
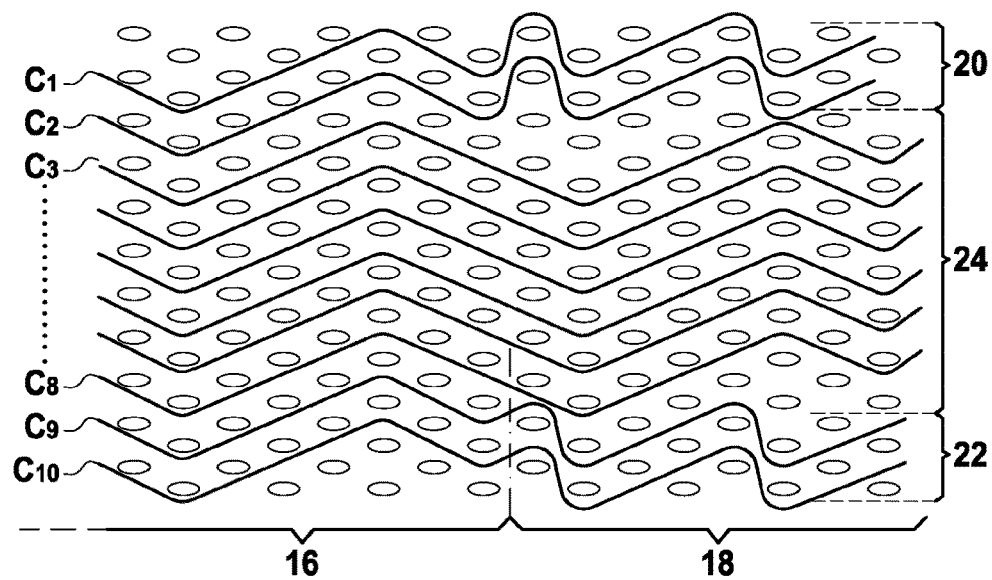

FIGS. 4A and 4B show two respective weave planes of the fiber reinforcement in the zone A in the proximity of a margin 18, in a second example. In this example, the fiber reinforcement of the entire central portion 16 presents an interlock weave, and the fiber reinforcement of the margins 18 presents a mixed weave with two portions 20 and 22 in the thickness of the margin 18 that present a (two-dimensional) serge weave, together with a portion 24 in the thickness of the margin 18 that presents a (three-dimensional) interlock weave.

As in the first example, the fiber reinforcement in the central portion 16 presents an interlock weave in which each warp yarn $c_1$ to $c_{10}$ interlinks three weft yarn half-layers. Thereafter, at the interface between the central portion 16 and the margin 18, the first two and the last two warp yarns $c_1$ & $c_2$ and $c_9$ & $c_{10}$ of the margin 18 follow a serge pattern in which each warp yarn takes hold of two weft yarns, and in which each warp yarn interlinks a single weft yarn layer T. The remaining warp yarns $c_3$ to $c_8$ continue their paths without changing pattern in the fiber reinforcement of the margin 18, interlinking three weft yarn half-layers with an interlock weave. In the portion 24, the weft yarn layers T are interlinked by the yarns $c_3$ to $c_8$. In the margins 18, the first two and the last two weft yarn layers T are not interlinked, nor are they linked with the portion 24. By using the weave shown herein by way of example, the margins 18 present a two-dimensional weave only in the portions 20 and 22. Thus, in this example, each margin 18 presents two strips of two-dimensional fabric in each portion 20 and 22; together with a strip presenting a three-dimensional weave in the portion 24. The above-mentioned strips in the portions 20, 22, and 24 are all connected to the central portion of the flow passage wall 10 by weaving.

In order to fabricate a platform 1 of the invention, it is possible to begin by weaving a fiber preform that is to form the fiber reinforcement of the platform. A box platform 1 as shown in FIG. 1 can be obtained from a single fiber preform. In a variant, it is possible to use a plurality of fiber preforms that are subsequently assembled together prior to densification, e.g. a fiber preform for the flow passage wall 10 and a fiber preform for the remainder of the platform. The fiber preform for the flow passage wall 10 is woven in compliance with the above-described weaving characteristics, e.g. using the above-described weave in the margins 18. Naturally, weaves other than those described above could be used without going beyond the ambit of the invention.

Finally, a matrix may be formed by any known method within the fiber preform of the platform 1, possibly after it has been shaped. For example, the platform 1 may be fabricated by injection molding resin into the fiber preform. This method is known as resin transfer molding (RTM). For this purpose, an injection mold is used having the shape of the platform 1 and in which the dry fiber preform is placed, after which resin under pressure is injected into the inside of the mold, the resin is solidified so as to form a matrix in the pores of the fiber preform, and the platform 1 as fabricated in this way is extracted from the mold.

The invention claimed is:

1. A fitted platform for positioning between two adjacent blades of an aviation turbine engine fan, said platform comprising:
   a flow passage wall made of composite material having a central portion, and first and second margins each extending in a longitudinal direction of said flow passage wall, each margin extending over a determined distance from the central portion in a transverse direction of said flow passage wall, said flow passage wall comprising fiber reinforcement densified by a matrix, wherein the fiber reinforcement present in the central portion presents three-dimensional weaving, and
   wherein the fiber reinforcement present in each of the first and second margins comprises at least two strips of two-dimensionally weaved fabric connected to the central portion by weaving.

2. The fitted platform according to claim 1, wherein the weave of the two-dimensionally weaved fabric in each of the first and second margins is one of plain, satin, or serge.

3. The fitted platform according to claim 1, wherein each margin extends in the transverse direction of the flow passage wall from the central portion over a determined distance D such that a ratio D/L lies in a range of 2% to 10%, where L is a width of the flow passage wall in the transverse direction of said flow passage wall.

4. The fitted platform according to claim 1, wherein each margin presents a thickness e such that a ratio e/D lies in a range of 5% to 50%, where D is a determined distance over which each margin extends in the transverse direction of the flow passage wall from the central portion.

5. The fitted platform according to claim 1, further comprising a bottom wall for resting on a fan disk, and two side walls extending between the bottom wall and the flow passage wall.

6. The fitted platform according to claim 1, wherein the fitted platform is made of composite material including fiber reinforcement densified by a matrix, the fiber reinforcement of the flow passage wall constituting a portion of the fiber reinforcement of the fitted platform.

7. An aviation turbine engine fan module comprising at least two blades and at least one fitted platform according to claim 1 positioned between two adjacent blades of the at least two blades.

8. An aviation turbine engine including a fan module according to claim 7.

9. A method of fabricating a fitted platform according to claim 1, the method comprising:
   weaving a fiber preform to form the fiber reinforcement of the flow passage wall of the fitted platform; and
   forming the matrix in pores of said fiber preform.

* * * * *